F. G. DICKERSON.
PROTECTOR FOR CAN VENTS.
APPLICATION FILED OCT. 27, 1906.
965,799.
Patented July 26, 1910.
2 SHEETS—SHEET 1.
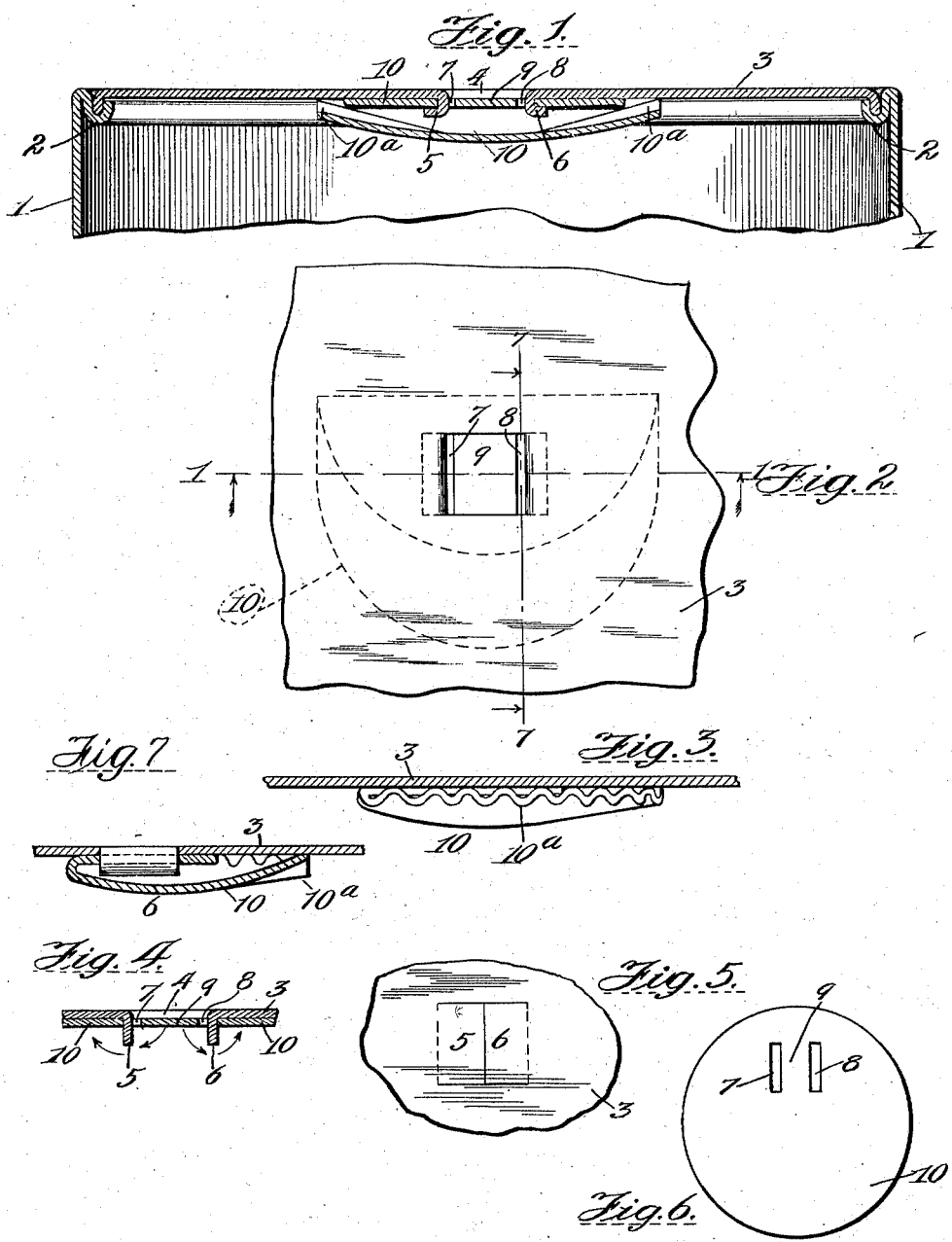

F. G. DICKERSON.
PROTECTOR FOR CAN VENTS.
APPLICATION FILED OCT. 27, 1906.
965,799.
Patented July 26, 1910.
2 SHEETS—SHEET 2.
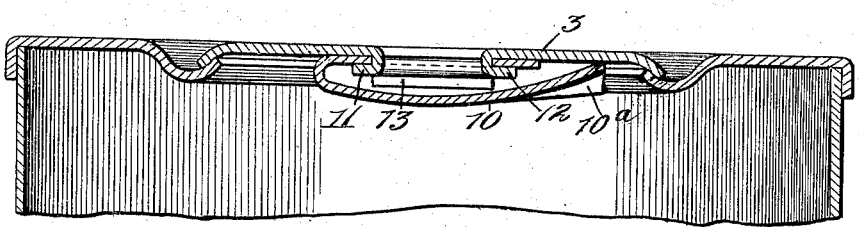
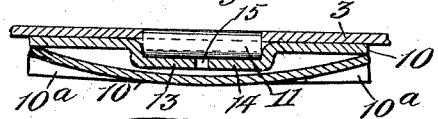
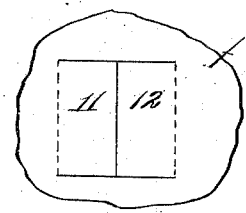
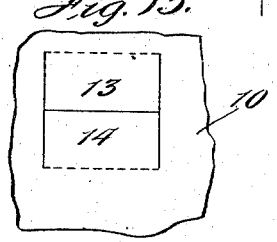
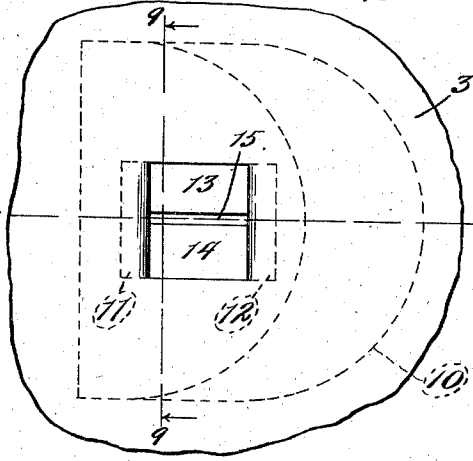
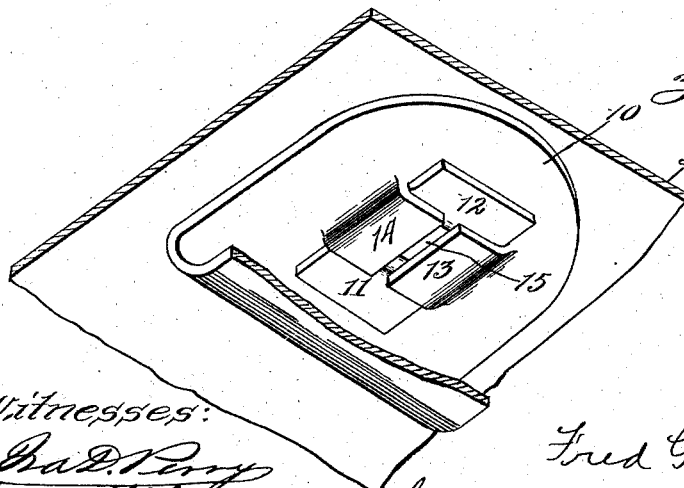
Witnesses:
Inventor
Fred G. Dickerson
by Brown Darby & Hopkins
attys

UNITED STATES PATENT OFFICE.

FRED G. DICKERSON, OF CHICAGO, ILLINOIS.

PROTECTOR FOR CAN-VENTS.

965,799.

Specification of Letters Patent. Patented July 26, 1910.

Application filed October 27, 1906. Serial No. 340,898.

*To all whom it may concern:*

Be it known that I, FRED G. DICKERSON, a citizen of the United States, residing at Chicago, in the county of Cook and State of Illinois, have invented certain new and useful Improvements in Protectors for Can-Vents, of which the following is a full, clear, and exact specification.

This invention relates to means for preventing solder from entering the contents of the can when the vent provided for the escape of air, steam or gas, is being closed or soldered up, and for also preventing the contents of the can from escaping through the vent before it is soldered or so near to it as to prevent the adhesion of the solder; and the invention has for its primary object to provide an improved means for accomplishing these ends, which will be inexpensive and efficient, and have a permanent or fixed relation to the vent.

Another object of the invention is to produce the vent by a part of the means employed for holding the vent protector in place.

With a view to the attainment of these ends, and the accomplishment of certain other objects which will hereinafter appear, the invention consists in the features of novelty which will now be described with reference to the accompanying drawings, and which are particularly pointed out in the claims.

In the said drawings Figure 1 is a transverse section of the upper end of the can, and having a vent, and being provided with these improvements. Fig. 2 is a plan view thereof. Fig. 3 is a transverse section of the top of the can, showing the protector in edge elevation. Fig. 4 is a section similar to Fig. 1, showing the lugs before they are clenched on the under side of the protector. Fig. 5 is a detail plan view of the top of the can, or cap, before the lugs are pressed downwardly. Fig. 6 is a detail plan view of the vent protector. Fig. 7 is a cross-section on the line 7—7, Fig. 2. Figs. 8 to 13 inclusive illustrate a modified form of the invention. Fig. 8 is a cross-section of the upper end of the can on the line 8—8, Fig. 10. Fig. 9 is a similar section on the line 9—9, Fig. 10. Fig. 10 is a plan view of the cap or top of the can, provided with these improvements. Fig. 11 is a detail perspective view of the under side of the cap or top, showing the vent protector in place, and partially broken away. Fig. 12 is a detail plan view of the part of the vent protector showing how the metal is slit to produce the vent-reducing lips, and Fig. 13 is a similar view of the cap or top of the can showing how the same is cut to produce the attaching lugs.

1 represents a portion of the body of the can, having any suitable means, such as a groove or gutter 2, whereby a top or cap 3 is secured in place by means of solder or other suitable sealing agent, in the usual or any appropriate way. It is customary in many instances in sealing or soldering the cap or head 3 in the can, to hold the can in an inverted or substantially inverted position, with the edge or gutter 2 submerged in the molten solder. The can is thus sealed, of course, while the contents are still hot or warm, and consequently while the contents are still giving off steam, expanded air, or other gases. For that reason it is desirable, if not necessary, to provide the can with a vent for the escape of excess pressure, which is of course subsequently closed by solder or other means, and this vent almost universally is situated in the cap or head of the can, and as a consequence, when the can is inverted for soldering in the head, the contents thereof is liable to leak through the vent, and by thus coating the surface of the metal contiguous thereto, prevent the solder from adhering when it is subsequently desired to close the vent. It has heretofore been proposed, therefore, to arrange a disk of metal on the top of the contents immediately below the cap or head of the can, in such a way as to cover the vent and hold the contents back, while permitting the escape of excessive pressure, and also preventing the solder from entering the contents when the vent is being soldered. This method, however, is far from satisfactory, inasmuch as in a large percentage of the cans the disk of metal drifts away from its proper position over the vent, and thereby necessitates the thorough cleansing of the metal contiguous to the vent, if not the removal of the cover and the replacement of the protector.

The present invention is designed to obviate these difficulties, and at the same time provide a vent which while being of sufficient size to allow of the free escape of the air or gases, is not so wide as to prevent the solder from bridging it and running down into the can. In this exemplification of the invention the head or cap 3 of the can is provided with a vent or aperture 4, which is produced by striking down into the can a pair of tongues or lugs 5, 6. Immediately under this vent within the can is situated the vent protector, which serves also as a reducer for reducing the size of the aperture 4 to a size that would be appropriate for soldering, it being obvious that the aperture which results from the reduction of the two lugs or tongues 5, 6, would be entirely too large as a vent to be subsequently closed by solder alone. Therefore, the protector, which originally has the form shown in Fig. 6, the same being preferably a mere disk of thin sheet metal, is provided with two slits 7, 8, arranged side by side and parallel, and adapted when the protector is in place to register with the aperture 4. They also register with and receive the lugs or tongues 5, 6, respectively, so that after the lugs are inserted through these slits they may be turned backwardly or away from each other, as shown in Fig. 1, for securely attaching the protector to the under side of the cap or head 3. The slits or apertures 7, 8, however, are slightly wider than their respective tongues 5, 6, so as to leave at the side of each a narrow slit or vent within or coinciding with the aperture 4, as shown in Fig. 1, these slits or vents being of much greater length than width, so that they will be adequate for the escape of excessive pressure, while they will be so narrow as to be readily bridged by the molten solder or other sealing agent, which if desired may be placed in the depression or recess constituted by the upper surface of that portion 9 of the protector which underlies the aperture 4 and the edges of said aperture. After the vent protector is thus secured it is folded backwardly upon itself to produce a protecting lip or shield 10, which completely covers or underlies the vent slits 7, 8, as well as the attaching lugs or tongues 5, 6. When thus folded or formed it serves to effectually hold back the contents of the can from finding its way to or through the vent slits 7, 8, while the head is being soldered in, and it subsequently serves as an effective means of preventing any solder that might leak through the vent slit from finding its way into the contents of the can, and it possesses the marked advantage of being permanently secured to the can in its proper relation to the vent without any possibility of displacement. In some instances it may be desirable to crimp or corrugate the edges of the vent shield 10, as shown at 10ª, to prevent the edge of the shield from lying too close to the cap or head, and possibly preventing the escape of the air or gases.

In the form of the invention shown in Figs. 8 to 13 inclusive is provided a construction whereby the small narrow slits 7, 8, employed in the other form may be dispensed with. In some instances it might not be feasible to make a die or punch sufficiently narrow to produce the slits 7, 8, that would stand the wear and tear to which it would necessarily be subjected in that work, and in order to obviate this difficulty, and at the same time have a slit or vent in the can that will be of sufficient size to allow the gases and air to escape and yet narrow enough to be bridged by the solder, the construction shown in the figures last aforesaid has been devised. In carrying this form into effect each of the two members—namely, the can top or cap and the vent protector— is provided with the H-shaped slits as shown in Figs. 12 and 13, which form on each two tongues or lugs. It is not material whether the attaching lugs be formed on the protector and passed through the cap or top, or on the top or cap and passed through the protector. In this exemplification of the invention the attaching lugs are formed on the top or cap 3 of the can, and hence the H-shaped slit shown in Fig. 12 produces the two lugs 11 and 12 which secure the protector to the can, while the H-shaped slit shown in Fig. 13 produces the two lugs 13, 14, which are subsequently utilized for reducing the size of the aperture formed in the cap or top 3, as an incident to turning inwardly the lugs 11, 12. The protector proper is the same in general form and arrangement as that described with respect to the first form of the invention, and hence is indicated by the same reference numeral 10. After the H-shaped slit shown in Fig. 12 is formed in the top or cap 3 of the can, the lugs 11, 12, are pushed downwardly or inwardly at substantially right-angles to the plane of the top, and the tongues 13, 14, are similarly depressed, so that in the protector 10 there will be formed a rectangular hole. This hole is of sufficient size to permit the lugs 11, 12, to pass therethrough, but the lugs 11, 12, are arranged at the sides of the hole, which extend transversely to the sides from which the tongues 13, 14, depend. The lugs 11, 12, are now bent backwardly as shown in Fig. 8, so as to engage the protector 10 and clamp the same firmly against the under side of the cap or top 3, thereby leaving through both the protector and the cap or top an aperture of liberal dimensions. The size of this aperture is of course dependent upon the size of the lugs 11, 12, and tongues 13, 14, which are made large, so that the die for producing them may be strong and substantial, but in order that this large aperture may be reduced to dimensions appropriate for being readily bridged and closed by a small amount of solder, the tongues 13, 14, are turned toward each other horizontally as shown in Fig. 9, and pressed back into the opening from which they came.

It is apparent, however, that inasmuch as they lie—at their edges at least—against or over the lugs 11, 12, their inner or free ends are prevented from coming into contact, and as a consequence the main aperture produced through both the protector and the cap or top is reduced to an elongated narrow slit 15, which occurs between the contiguous ends of the tongues 13, 14, and which constitutes the vent. This being elongated is of sufficient capacity to allow free egress of air and gases, while its side walls being close together are readily bridged and closed by the solder, as before explained. After the protector is thus secured and the vent produced, one side of the protector is folded back upon itself to produce the shield portion, as before explained with reference to Figs. 1 to 7.

It will thus be seen that in both forms of the invention the can is provided with a vent or aperture for the escape of air and gases which is larger than necessary for that purpose and is too large to be readily closed by solder, but which is subsequently reduced in dimensions or size by the means employed for holding the protector in place, or by a part of such means, such means in both instances consisting of an aperture in one member and an element on the other member passing through or into that aperture. It will also be seen that in both instances, a part of one of the elements—namely, the can top or cap and the protector—is utilized for reducing the size of the original aperture or vent to a size appropriate for soldering.

I claim:

1. The combination of a can, a closure for the can provided with a vent, means for securing the closure in position, a vent protector covering the vent within the can with sufficient space between the closure and protector to permit the passage of air through the vent, and interengaging means on the closure and the protector for securing the latter in position said means being disposed along the edges of said vent.

2. The combination of a can and a vent protector, one having means passing through the other for securing the protector in place, and the can having a vent covered by the protector.

3. The combination of a can having a vent, a protector for covering the vent, and means on one passing through the vent and engaging the other for holding the protector in place.

4. The combination of a can and a vent protector, one having means passing through the other for securing the protector in place, and the protector being folded back upon itself to cover its attaching means and the vent, and the can having a vent covered by the protector.

5. The combination of a can having a vent, a vent protector having an aperture registering with said vent, said vent and aperture being of different sizes, whereby one will reduce the other, and means for holding the protector in position with relation to the vent.

6. The combination of a can having a vent or aperture, a vent protector having a vent or aperture adapted to register with said first vent or aperture, one of the aforesaid parts having an integral tongue or lug passing through the vent or aperture in the other part, and a part of said protector being folded back upon itself to cover said vents or apertures.

7. The combination of a can having a vent or aperture, two lugs or tongues extending downwardly from the edges of said vent or aperture, a vent protector having slits in which said tongues or lugs are clenched for holding the protector in place, said protector having a portion bent back upon itself to cover said vent or aperture.

8. The combination of a can, a closure therefor having a vent or aperture, and a vent protector arranged thereunder within the can and having a corrugated or fluted edge to hold it partially away from the can, means for securing the closure in position and means projecting from the closure contiguous to the edges of said vent for securing the protector to the closure.

9. The combination of a can having a vent, and a protector for said vent, said can and protector having means for attaching the protector to the can over the vent, and one of the first two said elements having means projecting into and partially closing the vent.

10. The combination of a can having an aperture, a vent protector and means for securing the protector to the can, the vent protector having means projecting across and partially closing the aperture of the can.

11. The combination of a can having an aperture, and a lug contiguous to the edge of said aperture, a vent protector having an aperture registering with said first aperture, and a tongue contiguous thereto projecting across and partially closing the two said apertures.

12. The combination of a can having an aperture, and two lugs contiguous to the edges thereof, a vent protector having an aperture registering with said first aperture and through which said lugs project and engage against the protector for holding it in place, said protector having a tongue arranged transversely to said lugs, and arranged across and partially closing the apertures in the protector and can.

13. The combination of a can having an aperture and two lugs turned inwardly from the edges thereof, on diametrically opposite sides, a vent protector having an aperture registering with the first aperture, and tongues at its sides transversely arranged with respect to said lugs, said lugs being turned outwardly to clamp the protector, and said tongues being turned toward each other to partially close the apertures in the protector and can.

14. The combination of a can having an aperture and a lug contiguous to the edge of the aperture, a vent protector against which said lug is clamped for holding the protector in place, said vent protector having a tongue projecting across and partially closing said aperture, and another portion of the protector being turned backwardly upon itself for shielding or covering said aperture and tongue on the inner side of the can.

In testimony whereof I have signed my name to this specification, in the presence of two subscribing witnesses, on this 23rd day of October, A. D. 1906.

FRED G. DICKERSON.

Witnesses:
FRANCIS A. HOPKINS,
CHAS. H. SEEM.